United States Patent
Airey et al.

(10) Patent No.: US 7,150,768 B2
(45) Date of Patent: Dec. 19, 2006

(54) METHOD OF ASSEMBLING A CELL COMPRISING A PLURALITY OF ANODE AND CATHODE PLATES STACKED TOGETHER

(75) Inventors: Mathew Martin Airey, Warrington (GB); Harry Bridge, Leigh (GB); David Gerrard Leyland, Warrington (GB)

(73) Assignee: ABSL Power Solutions Ltd, Abingdon (GB)

( * ) Notice: Subject to any disclaimer, the term of this patent is extended or adjusted under 35 U.S.C. 154(b) by 271 days.

(21) Appl. No.: 10/312,700

(22) PCT Filed: Jun. 14, 2001

(86) PCT No.: PCT/GB01/02605

§ 371 (c)(1),
(2), (4) Date: Jan. 28, 2003

(87) PCT Pub. No.: WO02/03493

PCT Pub. Date: Jan. 10, 2002

(65) Prior Publication Data

US 2003/0170533 A1    Sep. 11, 2003

(30) Foreign Application Priority Data

Jun. 30, 2000   (GB)  ................................. 0016057.2

(51) Int. Cl.
*H01M 6/00*    (2006.01)

(52) U.S. Cl. ........................ 29/623.1; 29/623.4; 29/854
(58) Field of Classification Search ............... 29/623.1, 29/623.3, 623.5, 623.2, 854, 857, 730; 429/211, 429/209, 208, 161, 128, 123, 7
See application file for complete search history.

(56) References Cited

U.S. PATENT DOCUMENTS

| 5,296,318 | A | | 3/1994 | Gozdz ........................ 429/192 |
| 5,498,489 | A | * | 3/1996 | Dasgupta et al. ........... 429/152 |
| 6,423,449 | B1 | * | 7/2002 | Hong ..................... 429/231.95 |

FOREIGN PATENT DOCUMENTS

| EP | 0730316 | 9/1996 |
| GB | 2309703 | 8/1997 |

* cited by examiner

*Primary Examiner*—Raymond Alejandro
(74) *Attorney, Agent, or Firm*—William H. Holt

(57) ABSTRACT

A cell such as a lithium ion cell consists of an anode and a cathode comprising respective lithium ion insertion materials, separated by an electrolyte. A practical cell may be made by stacking a plurality of anode plates (14) and cathode plates (12) alternately, and interleaving a continuous layer (10) of polymer electrolyte or separator material between successive anode and cathode plates so it forms a zigzag. If the continuous layer is a separator, the assembly is then contacted with a solution comprising lithium salt in a compatible organic solvent, which provides the cell electrolyte. This procedure enables cells to be made with thin electrolyte layers, for example less than 30 μm thick, and hence of low internal resistance.

5 Claims, 1 Drawing Sheet

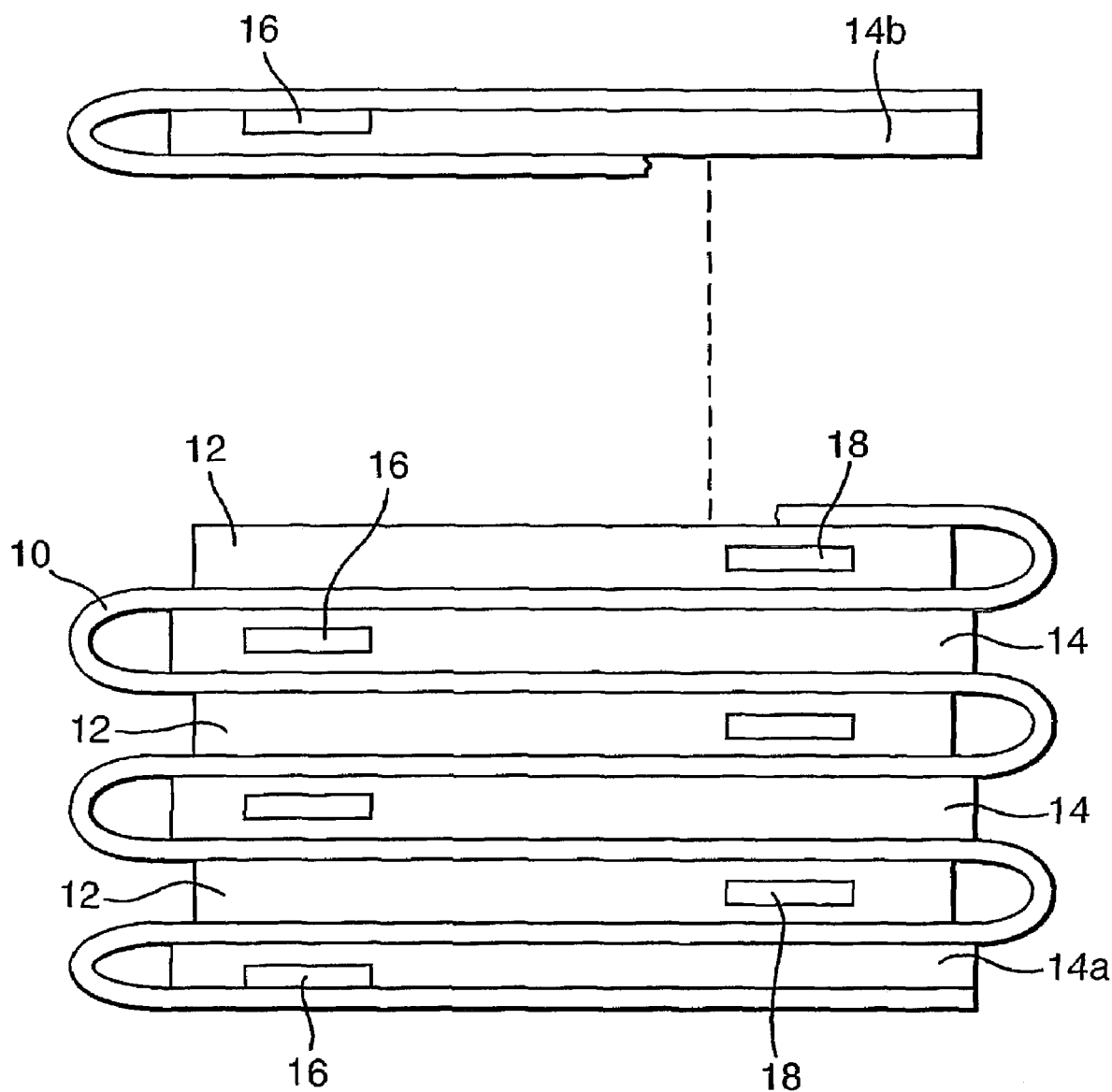

METHOD OF ASSEMBLING A CELL COMPRISING A PLURALITY OF ANODE AND CATHODE PLATES STACKED TOGETHER

FIELD OF THE INVENTION

This invention relates to a way of making a cell, for example a lithium ion cell, in which a plurality of anode and cathode plates are stacked together.

BACKGROUND OF THE INVENTION

For many years it has been known to make cells with lithium metal anodes, and cathodes of a material into which lithium ions can be intercalated or inserted. A wide variety of intercalation materials are known as cathode materials, such as lithium cobalt oxide, and lithium manganese oxide, and such materials may be mixed with solid electrolyte material to form a composite cathode. Such cells may use a separator such as filter paper or polypropylene saturated with, as electrolyte, a solution of a lithium salt in an organic liquid such as propylene carbonate. Alternatively a polymer-based solid electrolyte may be used, for example a complex of a lithium salt with poly-(ethylene oxide). In the case of secondary or rechargeable lithium cells, the use of lithium metal anodes is unsatisfactory as problems arise from dendrite growth, but the use of an intercalation material in the anode, such as graphite, has enabled satisfactory cells to be made. Such cells may be referred to as "lithium ion" cells, or "swing" cells, as lithium ions are exchanged between the two intercalation materials during charge and discharge.

Polymer electrolytes based on polyvinylidene fluoride and related copolymers have also been proposed, for example by Gozdz et al. (U.S. Pat. No. 5,296,318), in which a copolymer of 75 to 92 percent vinylidene fluoride and 8 to 25 percent hexafluoropropylene, blended with a lithium salt and a compatible solvent such as ethylene carbonate/propylene carbonate mixture is cast from solution in a low boiling-point solvent such as tetrahydrofuran. GB 2 309 703 B (AEA Technology) describes a similar electrolyte composition in which the polymer is polyvinylidene fluoride (PVdF) homopolymer, the PVdF being characterized by a very low melt flow index. It is also possible to make such a solid polymer electrolyte by first making a porous film of the polymer material, and then immersing the film in a solution of lithium salt in an organic solvent so the electrolyte solution combines with the polymer film, as described in EP 0 730 316 A (Elf Atochem).

SUMMARY OF THE INVENTION

According to the present invention there is provided a method of assembling an electrochemical cell comprising a plurality of anode plates and a plurality of cathode plates, each comprising respective insertion materials, the method comprising forming a stack of discrete, separate cathode plates and discrete, separate anode plates stacked alternately, each comprising a layer of a respective ion insertion material bonded to a metal current collector, and interleaving a continuous separator/electrolyte layer between successive plates so it forms a zigzag.

The electrochemical cell may be a lithium ion cell, the anode plates and cathode plates comprising respective lithium ion insertion materials, for example graphite in the anode plates and lithium cobalt oxide in the cathode plates.

The separator/electrolyte layer may be a porous, inert separator, for example of polyethylene or polypropylene, and in this case an electrolyte solution must subsequently be added to the assembly to form the cell. For example in a lithium ion cell this electrolyte solution would comprise a lithium salt dissolved in an organic solvent such as ethylene carbonate. Such a separator does not interact with the electrolyte solution. Alternatively the separator/electrolyte layer might for example comprise a porous sheet of PVdF-based polymer (homopolymer, copolymer, or grafted polymer); on subsequent addition of an electrolyte solution the polymer sheet interacts with the electrolyte solution to form a solid or gel electrolyte. As a further alternative the separator/electrolyte layer might comprise a polymer electrolyte comprising a PVdF-based polymer, a lithium salt, and a compatible organic solvent (similar to that described by Gozdz et al. U.S. Pat. No. 5,296,318 or AEA Technology (GB 2 309 703)). Where the separator/electrolyte is a porous sheet it is preferably microporous, with pores which are preferably between 0.1 and 10 µm across, more preferably between 0.5 and 2 µm.

Such a microporous membrane may be cast from a solvent/non-solvent mixture, or from a latent solvent, so that the entire process can be carried out in the absence of water or humidity, reducing the risk of water being present in the final film or membrane (which would be detrimental to the properties of a lithium cell). The non-solvent should not only dissolve in the solvent, but it should be miscible with the solvent in substantially all proportions. The boiling point of the non-solvent is preferably higher than that of the solvent, preferably about 20° C. higher. For example the solvent might be dimethyl formamide or dimethyl acetamide, in which case a suitable non-solvent is 1-octanol which is soluble in those solvents and whose boiling point is about 194° C. Alternative non-solvents would be 1-heptanol, 2-octanol, 4-octanol or 3-nonanol.

In making a microporous membrane the evaporation rate during drying must not be rapid, as rapid drying tends to produce macropores, and also may lead to formation of an impervious skin which prevents evaporation of underlying liquid. When using a latent solvent, the drying process should be carried out at a temperature below the dissolution temperature for the latent solvent. Consequently the polymer precipitates, and it is believed that two phases occur: a polymer-rich phase, and a polymer-poor phase. As the latent solvent evaporates the proportion of the polymer-rich phase gradually increases, but the remaining droplets of polymer-poor phase cause the formation of pores.

BRIEF DESCRIPTION OF THE DRAWING

The drawing shows an end elevation of a cell during manufacture.

The invention will now be further and more particularly described, by way of example only, and with reference to the accompanying drawing which shows manufacture of a cell of the invention (not to scale).

DETAILED DESCRIPTION OF THE INVENTION

Making a Porous Membrane

Homopolymer PVdF (Solvay grade 1015), which is characterised by having a low value of melt flow index (about 0.7 g/10 min at 10 kg and 230° C.), is dissolved in dimethyl formamide (DMF) at a temperature of 45° C. while stirring; 15 g of PVdF were dissolved in 85 g of DMF. A small quantity, 9 g, of 1-octanol is then added dropwise to the polymer solution, and carefully mixed during this addition to ensure the mixture is homogeneous. The quantity of 1-octanol must not be too large, or the solution will gel. The resulting ternary mixture is then cast, using a doctor blade over a roller, onto an aluminium foil substrate to form a layer initially 0.25 mm thick, and then passed through a 7 m long drying tunnel with two successive drying zones at temperatures of 65° C. and 100° C. respectively. It moves through the drying tunnel at 0.5 m/min. Within the drying zones the film is exposed to a dry air flow with a velocity of 14 m/s, to remove any solvent and non-solvent that evaporates. The dry air is obtained by passing air through a dehumidifier.

During passage of the film through the drying tunnel, which takes 14 minutes, both the solvent and non-solvent gradually evaporate (although they are both well below their boiling points), the solvent tending to evaporate more rapidly. A white polymer membrane is thereby obtained, of thickness about 20–25 µm, and analysis with a scanning electron microscope shows it to be microporous. The pores are of size in the range 0.5–2.0 µm, typically about 1 µm in diameter.

The microporous film is subsequently dried in a vacuum to ensure removal of all traces of both solvent and non-solvent.

Making the Electrodes

A cathode is made by making a mixture of spinel $LiMn_2O_4$, a small proportion of conductive carbon, and homopolymer PVdF 1015 as binder (as mentioned above), this being cast from solution in N-methyl-pyrrolidone (NMP) which is a solvent for the PVdF. The mixture is cast, using a doctor blade, onto an aluminium foil and then passed through a dryer with temperature zones at for example 80° C. and 120° C., to ensure evaporation of all the NMP (of which the boiling point is about 203° C.). This process is repeated to produce a double-sided cathode with the mixture adhering to each surface of the foil. Removal of the NMP may be further ensured by subsequent vacuum drying. Adhesion of the mixture to the foil may be further enhanced by calendering or low-pressure rolling.

An anode is made by making a mixture of mesocarbon microbeads of particle size 10 µm, heat treated at 2800° C. (MCMB 1028), with a small amount of graphite, and homopolymer PVdF 1015 as binder. This mixture is cast from solution in NMP, onto a copper foil, in a similar fashion to that described in relation to the cathode, dried, and calendered.

Several rectangular anode sheets and cathode sheets, with projecting metal foil tags, are then cut out. In one specific example the anodes might be 31 mm by 48 mm, and the cathodes 29 mm by 46 mm, each having an un-coated rectangular tab 9 mm wide projecting from one end.

Cell Assembly

Referring now to FIG. 1, which shows an end elevation of a cell during manufacture, a rectangular flat cell is then assembled from a long strip 10 of porous membrane 50 mm wide, nine double-sided cathode sheets 12 (29 mm by 46 mm), and ten anode sheets 14 (31 mm by 48 mm) eight of which are double-sided, one anode sheet 14a having anode mixture only on its upper surface and one anode sheet 14b having anode mixture only on its lower surface. A stack is made on one end of the strip 10, starting with the anode sheet 14a with anode mixture only on its upper surface, folding the strip 10 on top of that sheet 14a, then placing a cathode sheet 12 on top, then folding the strip 10 on top of that sheet 12, then placing an anode sheet 14 on top, then folding the strip 10 on top of the sheet 14, etc. The strip 10 is thus folded into a zigzag around each successive cathode sheet 12 and anode sheet 14. Finally the anode sheet 14b is placed on top of the stack, the strip 10 is folded on top, and cut off. Adhesive tapes are then used to hold all the components of the stack securely together.

The anode tabs 16 are then welded together to a single lead (not shown), and the cathode tabs 18 are welded together to a single lead (not shown).

Electrolyte Solution Preparation

The electrolyte solution in this example consists of a 1 molar solution of $LiPF_6$ in ethylene carbonate/ethyl methyl carbonate mixture. (The lithium salt concentration is 1.0 M, in this example, but might instead be in the range 0.3 M to 1.5 M, for example, and the salt might be different, for example a mixture of $LiPF_6$ and $LiBF_4$.)

Cell Completion

Each dried stack is then vacuum filled with the electrolyte solution, and left to soak at ambient temperature for several hours so all the components are thoroughly impregnated by the solution. It is then vacuum packed in a laminated flexible casing from which the two leads project.

The resulting cells have good electrical properties.

It will be appreciated that cells may differ from those described above, while remaining within the scope of the invention. In particular the electrode materials may differ from those described above, for example the cathode material might instead be a material such as $LiCoO_2$, or $LiNiO_2$, or $LiNi_{1-x-y}Co_xM_yO_2$ where x and y are each a number from 0 to 1 and together x and y add up to no more than 1, M is another metal, or vanadium oxide based material. The anode material might be a lithium alloy, tin oxide, natural graphite, synthetic graphite, or hard carbon, for example. And the numbers of anode sheets and cathode sheets may differ from that described above.

The invention claimed is:

1. A method of assembling an electrochemical cell comprising a plurality of anode plates and a plurality of cathode plates in a stack, each plate comprising a layer of a respective ion insertion material bonded to a respective metal current collector, those plates not at the ends of the stack comprising such layers bonded to both major surfaces of the current collector, and each plate being of generally rectangular shape with a projecting tab integral with the current collector, said method comprising the steps of forming a stack consisting of discrete, separate cathode plates and discrete, separate anode plates stacked alternately with a continuous separator/electrolyte layer interleaved between successive plates so it forms a zigzag, and with the tabs projecting from the stack, the stack being formed by repeatedly placing only one of the plates on the stack, and then folding the separator/electrolyte layer over it, and subsequently forming electrical connections between the tabs on all the cathode plates and between the tabs on all the anode plates.

2. A method as claimed in claim 1 in which the cell is a lithium ion cell and the anode plates and cathode plates comprise respective lithium ion insertion materials.

3. A method as claimed in claim 1 in which the separator/electrolyte layer is a porous sheet of polymeric material, and the method also comprises the step of subsequently adding an electrolyte solution for forming the cell.

4. A method as claimed in claim 3 in which the electrolyte solution interacts with the separator for forming a gel electrolyte after addition to the cell.

5. A method as defined in claim 1 wherein, after constructing the stack, the method then includes the further step of applying adhesive tapes for holding the stack securely together.

* * * * *